United States Patent
Forster

(10) Patent No.: US 6,926,930 B2
(45) Date of Patent: Aug. 9, 2005

(54) PROCESS FOR COATING THE SURFACE OF PLASTICS

(75) Inventor: Tibor Forster, Budapest (HU)

(73) Assignee: Izotop Intezet KFT., Budapest (HU)

( * ) Notice: Subject to any disclaimer, the term of this patent is extended or adjusted under 35 U.S.C. 154(b) by 0 days.

(21) Appl. No.: 10/469,710

(22) PCT Filed: Mar. 20, 2002

(86) PCT No.: PCT/HU02/00021
§ 371 (c)(1),
(2), (4) Date: Sep. 15, 2003

(87) PCT Pub. No.: WO02/074840
PCT Pub. Date: Sep. 26, 2002

(65) Prior Publication Data
US 2004/0146651 A1 Jul. 29, 2004

(30) Foreign Application Priority Data
Mar. 21, 2001 (HU) .............................. 0101145

(51) Int. Cl.⁷ ................................................ B05D 3/00
(52) U.S. Cl. .................... 427/322; 427/400; 427/412.1; 427/412.3; 427/412.4; 427/412.5
(58) Field of Search ............................... 427/322, 400, 427/412.1, 412.3, 412.4, 412.5

(56) References Cited

U.S. PATENT DOCUMENTS

| | | | |
|---|---|---|---|
| 3,503,913 A | 3/1970 | Lynch, Jr. et al. | |
| 3,619,246 A | 11/1971 | Bragole | |
| 3,720,540 A | 3/1973 | Wimmer | |
| 3,753,770 A | 8/1973 | Braude et al. | |
| 4,049,846 A | 9/1977 | Hovey | |
| 4,110,244 A | 8/1978 | Hovey | |
| 4,358,434 A | 11/1982 | Tzodikov et al. | |
| 4,839,445 A | * 6/1989 | Echigo et al. | 525/503 |
| 4,876,126 A | 10/1989 | Takemura et al. | |
| 5,039,549 A | 8/1991 | Nguyen et al. | |
| 5,049,403 A | 9/1991 | Larm et al. | |
| 5,455,108 A | 10/1995 | Quincy et al. | |
| 5,494,654 A | 2/1996 | Price et al. | |
| 5,583,211 A | 12/1996 | Coassin et al. | |
| 5,700,559 A | 12/1997 | Sheu et al. | |
| 5,851,726 A | 12/1998 | Ikuta et al. | |
| 5,914,182 A | 6/1999 | Drumheller | |
| 6,030,662 A | 2/2000 | Minamizaki | |

FOREIGN PATENT DOCUMENTS

| | | |
|---|---|---|
| DE | 3717209 | 12/1988 |
| EP | 0487854 | 6/1992 |
| EP | 0513510 | 11/1992 |
| HU | 177637 | 11/1981 |
| JP | 50-51577 | 5/1975 |
| WO | 98/37949 | 9/1998 |

OTHER PUBLICATIONS

English Language Abstract of DE 37 17 209.
Database WPI, Week 8012, Derwent Publications Ltd., London, GB, AN 1980–21460C. JP 48–014771 A, Feb. 1973.
Database WPI, Week 7544, Derwent Publications Ltd., London, GB, AN 1975–73147W. JP 50–051577 A, May 1975.

* cited by examiner

Primary Examiner—Kirsten Jolley
(74) Attorney, Agent, or Firm—Greenblum & Bernstein, P.L.C.

(57) ABSTRACT

Process for coating the surface of plastics comprising absorbing the vapor one or more internal reagent(s) in the plastic to be coated, and contacting one or more external reagent(s) with the surface of the plastic, wherein an immobilized coating is formed by a chemical reaction between the internal reagent(s) and the external reagent(s). The internal reagent(s) is(are) selected from substances which do not react with the plastic and the internal reagent(s) diffuse out of the plastic during contacting, wherein the coating is formed at the boundary layer of the plastic towards which the internal reagent(s) and the external reagent(s) diffuse.

11 Claims, No Drawings

PROCESS FOR COATING THE SURFACE OF PLASTICS

This application is the national stage application under 35 U.S.C. 371 of International Application No. PCT/HU02/00021, filed Mar. 20, 2002, which claims priority of HU P0101145, filed Mar. 21, 2001.

TECHNICAL FIELD

The invention relates to a new process for coating the surface of plastics.

It is well known that the use of plastics expands simultaneously with the technical development and their importance is growing significantly. Nowadays plastics are manufactured in huge quantities and applied in all areas of economy and life for the most different purposes. However, it frequently occurs that the surface of the material should have entirely different properties than the material itself. It is a common problem when applying plastics that a plastic may have ideal properties from a certain aspect but at the same time it is inadequate from other aspects of the application.

For instance, it frequently occurs that an indifferent plastic is an excellent structural material but its colorability is poor, its sticking properties are inadequate, the formation of chemical functional groups on its surface is difficult, its permeability to gas is too high or it is imperfect in other ways. In these cases the problem can be solved by modifying the surface of the plastics, e.g. coating the surface with an appropriate layer.

In that case when for the immobilisation of biologically active compounds the application of indifferent plastics would be required which do not interact during application, but the carrier does not have functional groups necessary for the covalent binding of the biologically active compounds, a good solution is to coat the indifferent carrier with a layer which has the necessary functional groups.

BACKGROUND ART

A number of solutions for coating the surface of plastics have been published.

According to U.S. Pat. No. 6,030,662, the coat is formed by an immersion process. In the first step of the process the substrate to be coated is immersed in a solution of a first coating compound having reactive groups and then dried. Then the coated substrate is subjected to an interfacial contact reaction with a second coating composition having at least one low-energy functional group and a reactive functional group that reacts with the functional group in the first coating compound. The interfacial contact reaction between the reactive functional groups in the first and second coating compositions fixes the low-energy functional groups to the substrate surface thereby reducing the surface energy of the substrate surface. In this way a stable binding of the layer is achieved. This method has some disadvantages, e.g. it is laborious, material-intensive and time-consuming. Subsequent stabilisation with a compound having low-energy functional group is not a favourable solution because only that part of the material is utilised which reacts with the inner side of the film layer. The material reacting on the external side or in the interior of the film layer has an adverse effect because it significantly modifies the original properties of the film.

According to U.S. Pat. No. 3,619,246, resin materials having low-surface energy are treated with photosensitizers and ultraviolet radiation. Applying a silane or siloxane, a transitional layer is formed which has a higher surface energy than that of the material to be coated. The transitional layer serves as a basis of the further coating (primarily painting).

According to U.S. Pat. No. 5,039,549, the polyolefin to be coated is soaked in a solution of an aromatic ketone photosensitizer. After removing the solvent, the surface is coated with a second solution comprising (i) a monomer selected from the group consisting of an unsaturated organic acid, an unsaturated organosulfonic acid, a vinyl monomer, (ii) an aromatic ketone photosensitiser and (iii) a low boiling point alcohol or ketone. The coated polyolefin is exposed to irradiation, washed and dried. The layer formed from the monomer makes the polyolefin capable to be glued.

The main disadvantage of the above two processes is the need for an extra device. In addition, carrying out homogeneous ultraviolet radiation is very complicated even with objects of regular shape. The coating can be produced after multistep pre-treatment, only.

According to U.S. Pat. Nos. 5,851,726 and 5,700,559, the surface is activated by ultraviolet irradiation and plasma treatment, respectively. After activation a film-like coating is formed by immersion into a coating material. The coating is bound to the surface by chemical adsorption and by ionic bond, respectively. The disadvantage of these processes is that they allow formation of film-like coatings only, since the binding is formed between the activated surface and the coating material contacting directly the activated surface.

According to U.S. Pat. No. 5,455,108, coating is formed on polymeric fabric in order to reduce the adsorption of proteins by the polymeric fabric. Fabrics are treated with solutions of various surfactants and exposed to corona discharge. The disadvantages of the method are that the coating on the fibres constituting the fabric is inhomogeneous and the process demands an extra device.

According to U.S. Pat. No. 5,583,211, on the surface of polypropylene nucleophile (preferably amino) groups are formed by exposing the polypropylene to plasma energy, then biopolymers (peptides, oligonucleotides, proteins, oligosaccharides) are attached to these groups by covalent bond. Although this process solves the old problem of binding biologically active molecules to indifferent carriers, plasma activation is applicable only in the case of plain surfaces, e.g. sheets, films and fibres.

According to U.S. Pat. No. 5,049,403, a polyamine of high average molecular weight is adsorbed on the surface to be coated and it is stabilized simultaneously with the adsorption or in a separate step by cross-linking with crotonaldehyde. The first layer thus obtained is treated with an anionic polysaccharide (for instance with dextran sulfate) to form a second layer. These steps are repeated by turns. In the last step a polyamine layer without cross-linking is formed. In this way a coating containing free amino groups is formed which may be used to form ionic or covalent bonds. The serious disadvantage of the method is that the layer thus formed is not stable enough, since only a part of the bonds holding the layer together is covalent. In case of forming cross-linking simultaneously with the adsorption, a loose precipitate-like layer is created, while in the two-step process a very thin monomolecular layer is formed. Because of the several repeated steps this process is quite long and difficult.

According to U.S. Pat. No. 5,914,182, the surface of the polymer to be coated is treated with a polymeric surfactant which is then cross-linked thereon to form a first layer. The first layer, through its remaining cross-linking groups, covalently binds to a second layer which has functional groups capable of covalently binding to biologically active substances. The process is quite long, it consists of several steps and is suitable for forming very thin, film-like coatings, only.

It is also known from the literature that coating plastics is a frequent task. The coating can be accomplished by several methods, e.g. by means of spraying, immersion, brushing, adsorption, chemical reaction, plasma energy, nebulisation. Coating neutral plastics is very difficult as the application of both the coating methods based on physical interaction and the coating methods based on chemical interaction are difficult or impossible because of their small surface-energy and the lack of reactive functional groups, respectively. The task is especially difficult if the object to be coated has a geometrical shape other than plain.

JP 48.014471A discloses swelling in a moulded thermoplastic resin with a vinyl monomer, and coating thereon an unsaturated polyester composition and curing. According to this technical solution, a liquid form of a vinyl monomer is absorbed in the termoplastic resin.

U.S. Pat No. 4,876,126A discloses a method of coating wherein a plastic is treated with a solution of a compound having a reactive functional group to form an undercoat and then it is further treated with a water-soluble polymer to covalently bond said reactive functional group with said water-soluble polymer.

DISCLOSURE OF THE INVENTION

The object of the present invention is to provide a process for coating plastics which eliminates the above described problems and allows carrying out coating tasks which cannot be accomplished or can be accomplished only with difficulties by the traditional methods. In particular, the process should be suitable for coating objects of complicated geometrical shape.

Another important object of the present invention is to provide a process suitable for coating also neutral plastics which is a very difficult task. Another aim of the invention is to create a coating on the surface of a plastic which contains, when necessary, reactive functional groups which allow to form (with or without chemical treatment) a layer with requested physical or chemical properties. A further purpose was to achieve these aims by the simplest way and at the lowest costs possible.

The invention is based on the recognition of the fact that the surface of plastics can be coated with a layer which is formed in a reaction between an internal reagent absorbed in the plastic and an external reagent which is in the space contacting the plastic. Surprisingly, we have found that the plastic substrates—depending on their properties—can absorb large quantities of reactive materials, then release them in an unchanged form. We have found that this phenomenon can be used to produce coatings.

Our experiments proved that the internal reagent outdiffusing from the plastic substrate (surrounded with the properly chosen external reagent) reacts with the external reagent thereby forming a layer on the surface of the plastic substrate. The internal reagent should be able to enrich in the plastic substrate and, when the conditions has been changed, to outdiffuse and react with the external reagent to form a reaction product capable of immobilizing on the surface of the plastic substrate to be coated as a layer.

On the basis of the above, the invention provides a process for coating a surface of a plastic comprising the steps of absorbing one or more first reagent(s) in the plastic to be coated, contacting one or more second reagent(s) with the surface of the plastic, wherein an immobilised coating is formed by a chemical reaction between the first reagent(s) and the second reagent (s), characterized in that the first reagent(s) is(are) internal reagent(s) the vapour of which is absorbed in the plastic in said absorbing step and diffuse out of the plastic in said contacting step, and the second reagent(s) is(are) external reagent(s), wherein the coating is formed at the boundary layer of said plastic towards which the internal reagent(s) and the external reagent(s) diffuse.

In the process according to the invention one or more internal reagents and one or more external reagents can be used.

MODES FOR CARRYING OUT THE INVENTION

Depending on the shape of the object (surface) to be coated, the formation of the coating layer can be accomplished in two different ways. It can be either a step-by-step process wherein steps i) and ii) are performed consecutively, or a continuous process wherein said steps are performed simultaneously by applying the internal reagent(s) through surface areas different from those to be coated. The step-by-step process can always be implemented while the continuous process is feasible only in special cases.

The formation of the coating layer can be accomplished by a continuous process if the surface for the absorption of the internal reagent and the surface to be coated can be separated. In these cases the internal reagent diffuses through the plastic to be coated. E.g. the inner surface of tubes can be coated in a way that the external reagent is fed into the inner part of the tube while the internal reagent is in contact with its outer surface. The internal reagent permeates through the tube material and reacts with the external reagent on the inner surface of the tube. In the case of forming outer coating the process is carried out in the reverse direction.

If the aim is to coat the whole surface (e.g. cube, fibre) or the surface for the absorption and the surface to be coated are not separable (when the shape of the object to be coated is irregular) the coating should be accomplished by a step-by-step process. In these cases the first step is the absorption of the internal reagent in the plastic to be coated. The formation of the coating layer occurs in a separate step when the plastic object is contacted with the external reagent which reacts with the outdiffusing internal reagent.

As internal reagent any compound can be used which is capable to absorb in the plastic to be coated. As external reagent any compound can be used which is capable to react with the internal reagent and form a reaction product capable to immobilise on the surface of the plastic.

As external reagent preferably a compound having two or more functional groups is used. The compound is preferably a polymer.

The internal reagent is preferably selected from the group consisting of oxalyl chloride, sulfuryl chloride, thionyl chloride, phosgene, dimethyldichlorosilane, methyltrichlorosilane, tetrachlorosilane, phosphorus oxychloride, phosphorus trichloride, acetaldehyde and ethylenediamine.

The process according to the invention can be used for coating the surface of all kinds of plastic, independently of their chemical character, shape, etc. When choosing the internal and external reagents, the properties of the plastic to be coated have to be taken into account.

In a preferred embodiment of the invention the internal reagent is applied together with an inert solvent which promotes its diffusion. Dilution of reactive materials of high diffusibility (e.g. phosgene, dimethyldichlorosilane) is especially preferred since the reactivity of the reagent and the necessary quantity of the reagent can be reduced.

It is often preferred to use additives also together with the external reagent in order to improve the properties of the coating layer. For example, an additive decreasing surface tension can improve the adhering properties of the coating. As additives decreasing surface tension both inert materials and polymers having reactive functional groups (e.g. polyvinyl alcohol) can be chosen.

In a preferred embodiment of the invention the external reagent is a solution of a polymer with several reactive functional groups being capable of enriching to some extent on the surface of the plastic to be coated. As examples, the aqueous solution of polyethylenimine (PEI) and polypropylene can be given. In such a system the hydrophobic part of the PEI molecules is directed towards the plastic surface, while their hydrophilic part towards the solution, creating a transitional layer the surface-energy of which gradually increases. This boundary layer can be "in situ" fixed by cross-linking of the amino groups of the polyethylenimine with the internal reagent (which outdiffuses from the plastic substrate). Cross-linking can be formed e.g. with bifunctional oxalyl chloride which forms bridges between the amino groups of the polyethylenimine. Tertiary amines of the polyethylenimine do not react with the oxalyl chloride, furthermore—if the external reagent is added in excess—not every primary and secondary amino group reacts with the internal reagent. As a result of the reaction, a layer (containing primary, secondary and tertiary amines; cross-linked with —CO—CO— bridges) is formed, which has three-dimensional network structure and adheres well to the surface of the polypropylene. This layer makes the surface of the polypropylene hydrophilic, therefore it will be suitable to be painted and glued. The amino groups are suitable for further derivatization, or, without derivatization, the layer can serve as an ion exchanger.

The main advantage of the process according to the invention—which radically differs from all processes of similar aim applied up to now—is that it makes possible carrying out coating tasks which cannot be accomplished or can be accomplished only with difficulties by other methods. Since the coating layer prepared by the process according to the invention is formed on the boundary layer of the material to be coated, it is possible to coat objects of complicated geometrical shape. For instance, it is possible to coat the internal surface of capillary tubes made from a neutral plastic material. The conventional coating processes based on physical interaction cannot be applied for the internal surface of the tube because of the influence of the capillary forces and the small surface energy, while the application of conventional chemical methods for coating is impossible because of the lack of functional groups. By means of the methods known up to now, forming of functional groups is not possible in the case of objects of special geometrical shapes. According to the process proposed by the invention, coating these objects can be carried out easily, even by the continuous process.

Another advantage of the process according to the invention is that it allows to form coatings with a reactive functional group on their surface. By changing the ratio of the quantity of the external reagent and that of the absorbed internal reagent, the reagent to be in excess can be chosen, thereby determining the functional groups on the surface of the layer. These functional groups can be further modified, therefore, it is possible to form surfaces with required physical properties. By modification of the functional groups the chemical characteristics of the coated object can be modified. For example, a neutral carrier may be transformed into an ion exchanger or can be modified in such a way that it will be capable to bind bioactive compounds by a covalent bond.

Further advantage of the application of the process according to the invention is that the physical and chemical properties of the coatings can be easily planned. As internal reagents such materials have to be chosen which do not react with the plastic to be coated but can absorb in it in a quantity necessary for the formation of the coating. The external reagent should react relatively fast with the internal reagent and the reaction product should immobilize on the surface. The reaction is controlled by diffusion, therefore, as reagents also those materials can be chosen which cannot be direct reagents in liquid phase because of the violence of the reaction. Because of the formation of the layer the fast and unique reactions are favourable, which means that the composition and structure of the reaction products constituting the layer can be planned well.

Another advantage of the process is that the layer is formed "in situ", i.e. during the coating process the molecules of the external reagent are immobilized in the position which is energetically the most stable state. The coating process, so to say, "freezes in" the state at the moment of the coating, therefore, the coating layer forms a stable (e.g. nonpolar-polar) transition between the plastic to be coated and the medium of the external reagent.

A great advantage of the invention is the possibility of its wide-ranging applicability. The use of the process put forward by the invention allows to solve a lot of problems—modification of physical properties of plastic objects by a simple coating layer, immobilization of biologically active materials, coating the surface of plastic objects by a metal layer, etc.

By means of the process suggested by the invention, formation of various coating layers can be accomplished economically because the implementation of the process is simple, there is no need of sophisticated devices and the reagents used for the formation of the coating layers are usually not expensive.

The invention is demonstrated with the following examples, without limiting the scope of protection.

EXAMPLE 1

The saturation of plastic substrates with the internal reagent in a step-by-step process is carried out in the following experimental set-up.

An open vessel of 2 ml is placed into a vessel of 20 ml with a screw cap. The internal reagents are placed into the open vessel of 2 ml. The plastic objects to be coated are placed into the vessel of 20 ml next to the vessel containing the reagent. After closing the external vessel, the system is incubated for a period of time. By this arrangement it is ensured that the reagent does not, only its vapours contact directly with the plastic to be coated.

EXAMPLE 2

Pieces of silicone rubber tubes having external diameter of 12 mm and wall thickness of 2 mm are placed into three vessels, as described in Example 1. The pieces of tubes are saturated with 100 µl of the following reagents: (2a) trimethylchlorosilane, (2b) dimethyldichlorosilane, and (2c) methyltrichlorosilane. After incubation of 6 hours the increase in weight of the plastic tubes is measured, then the tubes are placed into a 0.1 M NaOH solution. This solution is stirred overnight, then the pieces of tubes are washed three times with distilled water and dried for 6 hours at 150° C. temperature in a vacuum drying oven. In the cases of (2a) and (2b) there are no visible changes on the tubes, while in the case of (2c) the piece of tube is coated with a uniform, bright, white layer. This layer is about 0.5 mm thick and adheres well to the surface of the tube. (Table I /2a, 2b, 2c/ contains the results of weighting).

The results of the weightings have shown that the silicone plastic to be coated is capable to absorb a significant quantity (5.9 to 8.6% by weight) of the reagent. The internal reagents—depending on the number of chlorine atoms—have one, two or three reactive functional groups. The external reagent—in this case the water—can react with the internal reagent in a fast reaction (X—Cl+HOH→X—OH+ HCl) and in a slow reaction (X—OH+X—OH→X—O—X+$H_2O$). (The function of NaOH solved in the external reagent is to bind HCl forming as by-product.)

According to the above described experiment, in case (2a) a dimer, in case (2b) chain molecules, in case (2c) a three-dimensional network structure can be formed. In cases (2a) and (2b) only a layer consisting of relatively small molecules can be formed which adheres weakly to the surface, while in case (2c) the formation of a stable layer is permitted (theoretically the whole layer is a single molecule).

Pieces of tubes treated according to the method as identified in case (2c), are suitable for gluing as a result of the formation of the coating layer on them. Treated and untreated pieces of tubes have been glued with LOCTITE® 406 instant adhesive (ethyl cyanoacrylate). After one hour of drying time the untreated pieces can be easily separated, while the treated pieces become strongly fixed. This phenomenon has proved that the layer formed changed the features of the material to be coated.

EXAMPLE 3

In an experimental set-up as described in Example 1 a piece of tube of known weight, made of silicone rubber, having external diameter of 12 mm and wall thickness of 2 mm, is saturated with 100 µl of dimethyldichlorosilane. After incubation of 2.5 hours the increase in weight of the plastic tube is measured, then the piece of tube is placed into a 1% aqueous solution of polyvinyl alcohol. This solution is stirred overnight, then the piece of tube is washed three times with distilled water and dried for 5 hours at 150° C. temperature in a vacuum drying oven.

The results of the weighting (Table I, Example 3) show that, applying the same internal reagent as identified in Example 2a, and as a result of changing the external reagent, the weight of the coating layer has increased (from 0.9% to 2.8%). Namely, in this special case both the water and the polyvinyl alcohol are external reagents. Since polyvinyl alcohol is a macromolecule with several functional groups, the chain-like molecules formed from the reagent and water can create a layer with the polyvinyl alcohol, with a three-dimensional network structure.

As a result of the coating process, the optical properties of the silicone rubber tube change. The material of the tube which is translucent and opaque before coating becomes transparent.

EXAMPLE 4

A piece of silicone rubber tube of properties given in the above examples is coated first by the process identified in Example 3, then by the process identified in Example 2c. Both the visual observation of the tube and the results of weightings (Table I, 4/a, 4/b) prove that the two layers formed have different properties. Consequently, it is possible to create new layers on plastic objects which already have a coating layer and the different layers may be constituted of different reaction products.

EXAMPLE 5

The process as described in Example (2c) is repeated. The time of absorption of the internal reagent is the same but the incubation time is decreased from 6 hours to 1.5 hours. The results of the weightings (Table I, Example 5) show that—as expected—the weight of the coating layer formed will be smaller with decreasing incubation time. Since the geometrical dimensions of the tubes are the same, the lesser weight means that the layer is thinner. The thickness of the coating layer may be increased or decreased by changing the quantity of the absorbed internal reagent. Since the coating process is repeatable (see Example 4), coating layers with various thickness can be created by means of changing the parameters of the process suggested by the invention.

EXAMPLE 6

A piece of textile constituted of polyamide fibres is placed (as described in Example 1) into confined space filled with the vapours of a reagent of a mixture of dimethyldichlorosilane and trimethylchlorosilane in 1:1 ratio. After overnight incubation, the weight of the material to be coated becomes significantly greater. This piece of polyamide textile saturated with reagents is placed into a 5% aqueous solution of polyethylenimine. This solution is stirred overnight, then the polyamide textile is washed several times with distilled water and dried overnight at 60° C. temperature in a vacuum drying oven. After weighting (Table I, Example 6), the piece of polyamide textile—along with an untreated control piece—is placed into a solution consisting of 0.1 g Coomassie Brillant Blue dye (manufacturer: Loba Chemie, Austria), 50 ml methanol, 10 ml acetic acid and 40 ml distilled water for 5 minutes. After colouring, the pieces of polyamide textile are washed with a solution consisting of 50 ml methanol, 10 ml acetic acid and 40 ml distilled water for 5 minutes, then aired at ambient temperature. The treated piece of textile becomes coloured deep blue, while the untreated control textile remains uncoloured.

EXAMPLE 7

In an experimental set-up as described in Example 1 three pipette tips of 200 µl volume made of polypropylene are incubated overnight with a mixture consisting of 5 µl of oxalyl chloride (internal reagent) and 100 µl of trichloroethylene (neutral solvent). After weighting (Table I, Example 7), 30 µl of 3% aqueous solution of polyethylenimine as external reagent is sucked into the pipette tips, then the tips are incubated overnight in a vapour cabinet. After removing the solution, the pipette tips are washed with water and alcohol and are dried for 3 hours at 80° C. temperature in a vacuum drying oven. The layer formed in the inside of the pipette tips is made visible by the colouring method as described in Example 6. The layer containing amino groups formed in the inside of the pipette tips becomes coloured uniform dark blue in that part of the tips which was filled with polyethylenimine solution.

EXAMPLE 8

In an experimental set-up as described in Example 1 two pieces of thin-wall PCR tubes (200 µl) made of polypropylene are placed into confined space filled with the vapours of 50 µl sulfuryl chloride for 2 hours. After weighting (Table I, Example 8), 100 µl of 5% aqueous solution of polyethylenimine, as external reagent, is filled into the tubes. After one hour of incubation, the solution is removed, the tubes are washed several times and, finally, are dried for 3 hours at 80° C. temperature in a vacuum drying oven. The layer formed in the inside of the tubes is made visible by the colouring method as described in Example 6. The layer containing amino groups formed in the inside of the tubes becomes coloured blue up in that part of the vessels which was filled with the solution of external reagent. This layer is inhomogeneous to some extent at the height of the meniscus of the external reagent.

EXAMPLE 9

The process as described in Example 8 is repeated with the difference that more internal reagent is used, moreover, a mixture of 100 µl of 5% aqueous solution of polyethylenimine (external reagent) and 1 µl of 10% aqueous solution of polyvinyl alcohol (additive) is filled into the tubes to be coated. As a result of the surface tension decreasing effect of the additive, the layer, after applying the same colouring method as described in Example 8, is perfectly homogenous and its colour is darker (Table I, Example 9).

TABLE I

| Ex. | Plastic to be coated Name | Weight [mg] | Saturation Internal reagent | Change of weight [mg] (%) | Formation of coating layer External reagent | Change of weight [mg] (%) |
|---|---|---|---|---|---|---|
| 2a | silicone | 426.4 | trimethylchlorosilane | 25.2 (5.9%) | water | −0.9 (−0.2%) |
| 2b | silicone | 521.5 | dimethyldichlorosilane | 37.2 (7.1%) | water | 4.8 (0.9%) |
| 2c | silicone | 459.4 | methyltrichlorosilane | 39.4 (8.6%) | water | 11.3 (2.5%) |
| 3 | silicone | 514.2 | dimethyldichlorosilane | 47.5 (9.2%) | water + polyvinyl alcohol | 14.5 (2.8%) |
| 4a | silicone | 348.2 | dimethyldichlorosilane | 32.1 (9.2%) | water + polyvinyl alcohol | 9.8 (2.8%) |
| 4b | silicone | 358 | methyltrichlorosilane | 36.6 (10.2%) | water | 19.7 (5.5%) |
| 5 | silicone | 460.5 | methyltrichlorosilane | 41.8 (9.1%) | water | 6.1 (1.3%) |
| 6 | polyamide | 31.9 | dimethyldichlorosilane trimethylchlorosilane (1:1) | 10.9 (34.2%) | 5% polyethylenimine | 0.2 (0.6%) |
| 7 | polypropylene | 350 | oxalyl chloride/ trichloroethylene | 21.1 (6.0%) | 3% polyethylenimine | 0.9 (0.2%) |
| 8 | polypropylene | 104.1 | sulfuryl chloride | 1.3 (1.2%) | 5% polyethylenimine | 0 (0%) |
| 9 | polypropylene | 104.3 | sulfuryl chloride | 3.3 (3.2%) | 5% polyethylenimine, 0.1% polyvinyl alcohol | 0.2 (0.2%) |
| 16 | polypropylene | 103.6 | oxalyl chloride | 5.2 (5.0%) | 1 mg/ml BSA | 0.1 (0.1%) |
| 17a | silicone | 385.1 | oxalyl chloride | 41.3 (10.7%) | ethylenediamine (vapour) | 2.1 (0.5%) |
| 17b | silicone | 384.4 | oxalyl chloride | 38.5 (10.0%) | 2 M ethylenediamine | 7.2 (1.9%) |
| 18 | silicone | 439.3 | ethylenediamine | 14.6 (3.3%) | oxalyl chloride | 2.0 0.5% |
| 19 | silicone | 467.5 | ethylenediamine | 4.3 (0.9%) | $Ag^+$ | 5.5 (1.2%) |
| 20 | polyethylene | 304.3 | acetaldehyde | 3.2 (1.1%) | $Ag^+$ | 0.9 (0.3%) |
| 21 | polyethylene terephthalate | 131.4 | acetaldehyde | 4.0 (3.0%) | $Ag^+$ | 2.9 (2.2%) |

EXAMPLE 10

Pipette tips are coated as described in Example 7 but instead of testing the colouring process, the applicability of using the coating layer as ion exchanger is tested, according to the following method.

1 M acetic acid is sucked into the pipette tips and they are incubated for 10 minutes. After removing acetic acid, the tips are washed three times with distilled water. A titrant of the following composition is prepared:

197 µl of 0.1 mM Tris-acetate (pH 5.0),

2 µl of 0.5 mM adenosine triphosphate and

1 µl of γ-[$^{32}$P] adenosine triphosphate.

25 µl of titrant is sucked into the pipette tips having ion exchange layer changed for acetate form and the tips are incubated for 5 minutes. After incubation, the liquids in the tips are transferred into a scintillation vial and the tips are washed with distilled water and alcohol. 25 µl of 1 M Tris-base is sucked into the pipette tips and the tips are incubated for 5 minutes. After incubation, the liquids in the tips are transferred into another scintillation vial. By measuring the radioactivity of the original sample and those of the samples in the scintillation vials it was established that the layer in the pipette tips bound 98.74% of the original activity (the labelled nucleotide) and 91.54% of the bounded nucleotide could be eluted from the layer. Untreated pipette tips applied as control were also measured, however, they have not shown any features which would indicate ion exchange. Measuring the treated pipette tips has shown features which are characteristic of weak anion exchangers and indicates that the polypropylene pipette tips were coated with a stable layer containing amino groups.

EXAMPLE 11

The internal surfaces of pipette tips are coated as described in Example 7. Amino groups of the coating layer are derivatized with 40 mM solution of succinic anhydride in acetonitrile. Those amino groups which remain unchanged during the treatment are eliminated with acetic anhydride. The tips are washed and dried. By means of this treatment the layer containing free amino groups is transformed into a layer containing free carboxyl groups. The layer containing free carboxyl groups allows further derivatization (for instance, enzyme immobilization through the formation of active esters) or it can be applied as weak cation exchanger. The effectiveness of the treatment is shown by the fact that the colouring of the layer was impossible by the application of the colouring method as described in Example 6.

EXAMPLE 12

Formation of coating layer by a continuous process.

A TEFLON® tube of 1 m length, 0.5 mm of inner diameter and 1 mm of outer diameter is conducted through a closed glass vessel of 100 ml volume in a way that the tube is hermetically sealed at the inlet and outlet, ensuring airtight connections. An 80 cm piece of the whole length of the tube wound into loop is placed into the vessel. 10 ml of trichloroethylene (solvent) and—through a vacuum system—0.1 ml of phosgene (internal reagent) are added into the vessel. A part of the capillary tube wound into loop is placed in the liquid and the other part of it being outside of the liquid is in contact with the vapours of the reagent, only. An 5% polyethyleneimine solution is circulated in the TEFLON® tube for 2 hours. After dismounting the system, the tube is washed with distilled water, then dried in a vacuum drying oven at 105° C. for 5 hours. After drying, the tube is coloured and rinsed according to the method described in Example 6. As a result of colouring a uniform blue layer is visible on the internal surface of the tube.

EXAMPLE 13

The process as described in Example 12 is repeated but different internal reagents (oxalyl chloride, phosgene), different external reagents (polylysine, poly(phenylalanine-lysine), polyethyleneimine) and tubes made of different materials (TEFLON®, polyethylene, polypropylene) are used. Performing the process with all of the variations of internal reagents, external reagents and tube materials resulted in uniformly coloured layers of different intensity.

EXAMPLE 14

The coating process as described in Example 12 is repeated but instead of colouring 10 mM solution of biotin N-hydroxysuccinimide ester in dimethyl sulfoxide is added. After 2 hours of incubation, the tube is washed with dimethyl sulfoxide, ethanol and water, then dried. As a result of the treatment, biotin is bound by covalent bond to the free amino groups of the layer formed. Binding of the biotin was proved by titration with labelled $^{125}$I-streptavidine solution. $^{125}$I-streptavidin/PBS (Phosphate Buffered Saline) solution (pH 7,4) of 400,000 cpm/ml radioactive concentration is added into a piece of tube of 10 cm length and then it is incubated for 1 hour at ambient temperature. The composition of the PBS solution is as follows: 8 g NaCl, 0.2 g KCl, 1.15 g $Na_2HPO_4.2H_2O$, 0.2 g $KH_2PO_4$, diluted with distilled water to a volume of 3 liters; pH is adjusted with NaOH to 7.4. After removing the titrant, the tube is washed three times with PBS solution (pH 7,4), then its radioactivity is measured. It was established that the tube has bound 97.4% of the labelled streptavidin. Consequently, the process described in the example is suitable for the formation of a layer containing functional groups; the layer can be modified by appropriate reagents.

EXAMPLE 15

The process as described in example 14 is repeated but instead of demonstrating the presence of the biotin, streptavidin/PBS solution (pH=7.4) of 0.01 mg/ml concentration is added into the tube. After two hours of incubation, the tube is washed with PBS. As a result of the biotin-streptavidin bond, the layer coated with biotin is transformed into a layer coated with streptavidin. Since one streptavidin molecule is capable of binding four biotin molecules, the immobilized streptavidin layer is capable of binding further biotin molecules or further molecules labelled with biotin. The immobilized streptavidin layer is detected with an oligomer ($dT_{25}$) labelled with biotin on its 5' end and with P-32 isotope on its 3' end. A piece of tube of 10 cm length is incubated with the solution of the labelled oligomer (40,000 Bq/$\mu$l, 1 pmole/$\mu$l) for 2 hours. After incubation, the labelled solution is removed and the tube is washed with 1 M NaCl solution containing 0.1% Triton X-100 detergent (manufacturer: Reanal, Budapest, Hungary). The quantity of bound oligomer is measured by Cherenkow radiation.

We found that the layer bound 96.5% of the biotinylated oligomer. Therefore, the layer formed by the process of the invention is suitable for the immobilization of bioactive compounds after a proper derivatization.

EXAMPLE 16

In an experimental set-up as described in Example 1 two pieces of thin-wall PCR tubes (200 $\mu$l) made of polypropylene are placed into confined space filled with the vapours of 50 $\mu$l oxalyl chloride overnight. After weighting (Table I, Example 16), BSA solution of 1 mg/ml concentration is filled into the tubes. The tubes are closed with caps and incubated overnight at ambient temperature. After the BSA solution is removed the tubes are washed three times with PBS buffer solution containing a detergent, then dried for 3 hours at 80° C. temperature in a vacuum drying oven. The tubes are coloured according to the method as described in Example 6. As a result of colouring, it has become visible that a uniform, blue layer formed in the internal side of the vessels up to that height where the BSA solution was present. This experiment proved that by means of the process according to the invention it is possible to coat polypropylene with BSA, an operation that cannot be accomplished or can be accomplished only with poor efficiency by the conventional adsorption method.

EXAMPLE 17

In an experimental set-up as described in Example 1 two pieces of silicone rubber tube of known weight are incubated in oxalyl chloride vapours for 2.5 hours. After weighting, one of the pieces is placed into confined space filled with the vapours of ethylenediamine (Table I, Example 17a), the other one is placed into 2 M aqueous solution of ethylenediamine (Table I, Example 17b). The pieces of tubes are incubated overnight, then washed with distilled water, finally dried for 2.5 hours at 80° C. temperature in a vacuum drying oven. In both cases a whitish coating layer is formed at the end of the process. The pieces of tube lose their slippery, "silicone-like" nature and become suitable for gluing. In this way it was demonstrated that the external reagent—if the conditions are suitable—can be applied in both vapour phase and liquid phase.

EXAMPLE 18

The process as described in Example 17 is carried out with the reagents reversed, i.e. pieces of silicone rubber tube are incubated in ethylenediamine overnight, then—after weighting (Table I, Example 18)—placed into oxalyl chloride vapours for 20 minutes. In order to ensure the excess of ethylenediamine, the incubation continues in the open air for 2 hours. Then the tube is washed with distilled water, dried for 2.5 hours at 80° C. temperature in a vacuum drying oven. At the end of the process—like in the process described in Example 17—a whitish coating layer forms which can be glued well. This example demonstrates that the internal and external reagents—in certain cases—are interchangeable.

EXAMPLE 19

In an experimental set-up as described in Example 1 a piece of silicone rubber tube of known weight is incubated in ethylenediamine vapours for 6 hours. After weighting (Table I, Example 19), the piece of tube is placed into polyethylene vial containing 5 ml of Tollens reagent which is prepared as follows: 1 g $AgNO_3$ is solved in 10 ml of water and 1 g NaOH is solved in 10 ml of water; 1 ml NaOH solution is added to 1 ml $AgNO_3$ solution; cc. ammonium hydroxide is added to the reagent until the precipitated $Ag_2O$ is dissolved. In a few minutes the precipitation of metallic silver begins on the whole surface of the silicone rubber tube. The vial is shaken for an hour, then the coated tube is rinsed with distilled water and finally it is dried for 2.5 hours at 80° C. temperature in a vacuum drying oven. By applying the process of the invention the whole surface of the tube is coated with a silver layer. Due to the gradient created by the reducing reagent diffusing out from the plastic tube, the whole surface of the plastic tube is coated, while the walls of the plastic vial are not coated with silver.

EXAMPLE 20

In an experimental set-up as described in Example 1 a piece of polyethylene tube of 15 cm length, of 0.5 mm inner diameter and 1 mm outer diameter is incubated in acetaldehyde vapours overnight. After weighting (Table I, Example 20), the end of the tube is pulled on a pipette tip. By means of the pipette Tollens reagent is sucked into the polyethylene tube. The formation of the silver layer begins in a few minutes. By means of the pipette the Tollens reagent is supplied from time to time. After incubation of 1 hour the tube is rinsed with distilled water and then dried for 2 hours at 80° C. temperature in a vacuum drying oven. As a result of the coating process, the inside of the tube is coated with a silver mirror layer.

EXAMPLE 21

In an experimental set-up as described in Example 1 a plate of 2×1 cm dimensions and of 0.5 mm thickness, made of polyethylene terephthalate is incubated in acetaldehyde vapours overnight. After weighting (Table I, Example 21), the plastic plate is placed into a polyethylene vial containing 5 ml of Tollens reagent. In this experiment an identical result is obtained as in Examples 19 and 20: the plate is coated with a silver layer. Instead of the drying in a vacuum drying oven applied in the previous examples, the plate coated with silver is rinsed with distilled water, then electrolysed as cathode in $CuSO_4$ solution. In a few minutes a copper layer is deposited onto the silvered surface. The thick copper layer formed by electrolysis strongly adheres mechanically to the surface. This experiment proved that by means of the process of the invention, it is possible to coat plastic objects with silver layer which constitutes a good basis for applying further metal layers onto the surface.

What is claimed is:

1. A process for coating a surface of a plastic comprising:

absorbing vapor of at least one internal reagent in the plastic to be coated, the at least one internal reagent not reacting with the plastic;

contacting at least one external reagent with the surface of the plastic, the at least one external reagent comprising a solution of the at least one external reagent, and the at least one internal reagent diffuses out of the plastic during said contacting;

forming an immobilized coating by a chemical reaction between the at least one internal reagent and the at least one external reagent; and the coating is formed on a boundary layer of said plastic towards which the at least one internal reagent and the at least one external reagent diffuse.

2. The process according to claim 1, wherein the absorption and the contacting are performed consecutively.

3. The process according to claim 1, wherein the absorption and the contacting are performed simultaneously by applying the at least one internal reagent through surface areas separated from those to be coated.

4. The process according to claim 1, wherein the at least one external reagent is a solution of a polymer containing at least two reactive functional groups.

5. The process according to claim 4, wherein the polymer solution is an aqueous solution of polyethyleneimine.

6. The process according to claim 1, wherein the at least one internal reagent is selected from the group consisting of oxalyl chloride, sulfuryl chloride, thionyl chloride, phosgene, dimethyldichlorosilane, methyltrichiorosilane, tetrachiorosilane, phosphorus oxychloride, phosphorus triclilioride, acetaldehyde and ethylenediamine.

7. The process according to claim 1, wherein the plastic is a neutral plastic.

8. The process according to claim 1, wherein the plastic is selected from the group consisting of silicone, polyamide, polyethylene, polypropylene, polytetrafluoroethylene and polyethylene terephthalate.

9. The process according to claim 1, wherein the coating is formed in the presence of an additive.

10. The process according to claim 9, wherein the additive is a surface tension decreasing additive.

11. The process according to claim 1, wherein the absorption and the contacting are performed simultaneously.

* * * * *

UNITED STATES PATENT AND TRADEMARK OFFICE
CERTIFICATE OF CORRECTION

PATENT NO. : 6,926,930 B2
DATED : August 9, 2005
INVENTOR(S) : T. Forster

It is certified that error appears in the above-identified patent and that said Letters Patent is hereby corrected as shown below:

<u>Column 14,</u>
Line 51, "methyltrichiorosilane" should be -- methyltrichlorosilane --.
Line 52, "tetrachiorosilane" should be -- tetrachlorosilane --.
Line 53, "tricliloride" should be -- trichloride --.

Signed and Sealed this

Eleventh Day of April, 2006

JON W. DUDAS
*Director of the United States Patent and Trademark Office*